United States Patent
Takahashi et al.

(10) Patent No.: US 9,657,585 B2
(45) Date of Patent: May 23, 2017

(54) AXIAL COMPRESSOR AND OPERATION METHOD OF THE SAME

(71) Applicant: Mitsubishi Hitachi Power Systems, Ltd., Yokohama (JP)

(72) Inventors: Yasuo Takahashi, Tokyo (JP); Tetsuro Morisaki, Tokyo (JP); Chihiro Myoren, Tokyo (JP); Kohta Kawamura, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 617 days.

(21) Appl. No.: 14/071,922

(22) Filed: Nov. 5, 2013

(65) Prior Publication Data

US 2014/0178176 A1    Jun. 26, 2014

(30) Foreign Application Priority Data

Dec. 26, 2012 (JP) ................... 2012-281944

(51) Int. Cl.
*F01D 11/24* (2006.01)
*F02C 3/30* (2006.01)
*F02C 7/143* (2006.01)

(52) U.S. Cl.
CPC .............. *F01D 11/24* (2013.01); *F02C 3/305* (2013.01); *F02C 7/1435* (2013.01);
(Continued)

(58) Field of Classification Search
CPC ......... F01D 11/24; F02C 7/1435; F02C 3/305
See application file for complete search history.

(56) References Cited

U.S. PATENT DOCUMENTS 6,152,685 A * 11/2000 Hagi ................. F01D 11/24
 415/116
2003/0223863 A1  12/2003 Laurello et al.
(Continued)

FOREIGN PATENT DOCUMENTS

JP        63-97898 A     4/1988
JP        2004-3492 A    1/2004
(Continued)

OTHER PUBLICATIONS

Japanese Office Action issued in counterpart Japanese Application No. 2012-281944 dated Aug. 2, 2016 with English translation (seven (7) pages).

*Primary Examiner* — Woody Lee, Jr.
(74) *Attorney, Agent, or Firm* — Crowell & Moring LLP

(57) ABSTRACT

An axial compressor comprising liquid drop feed means for feeding liquid drops to an operating fluid of the compressor, a casing for forming a flow path through which the operating fluid flows down and a plurality of stages, each of which is composed of one continuous rotor blade row and one continuous stator vane row, the axial compressor being structured so that the liquid drops evaporate inside the compressor, characterized in that: the casing is provided with a cavity therein, and the cavity is formed by an outer casing and an inner casing which is enclosing a periphery of the rotor blade rows at the plurality of stages and forming internally a flow path of the operating fluid, and a flow path is provided for feeding the operating fluid to the cavity on a downstream side of a region forming the cavity of the inner casing.

10 Claims, 6 Drawing Sheets

(52) U.S. Cl.
CPC ............... *F05D 2270/3062* (2013.01); *F05D 2300/50212* (2013.01); *Y02T 50/675* (2013.01)

(56) References Cited

U.S. PATENT DOCUMENTS

| | | | |
|---|---|---|---|
| 2004/0033133 A1 | 2/2004 | Muny | |
| 2006/0225430 A1* | 10/2006 | Paprotna | F01D 11/24 60/782 |
| 2007/0043497 A1* | 2/2007 | Leogrande | F01D 11/24 701/100 |
| 2008/0063509 A1* | 3/2008 | Sutherland | F01D 11/24 415/14 |
| 2010/0292906 A1* | 11/2010 | Girouard | F01D 17/02 701/100 |

FOREIGN PATENT DOCUMENTS

| | | |
|---|---|---|
| JP | 2004-76726 A | 3/2004 |
| JP | 2008-196399 A | 8/2008 |

* cited by examiner

AXIAL COMPRESSOR AND OPERATION METHOD OF THE SAME

CLAIM OF PRIORITY

The present application claims priority from Japanese patent application JP 2012-281944 filed on Dec. 26, 2012, the content of which is hereby incorporated by reference into this application.

BACKGROUND OF THE INVENTION

Field of the Invention

The present invention relates to an axial compressor for a gas turbine or for industrial use, which includes an intake air spray, and an operation method of the axial compressor.

Description of Related Art

In the operation of a gas turbine in the summer season, for example, when the atmospheric temperature is high, the intake air density lowers, thus the gas turbine output reduces. To cope with this output reduction, there is a method of improving the gas turbine output due to the effect of intake air cooling obtained by spraying liquid drops such as water to sucking air of the compressor and thereby increasing the intake air density. Furthermore, when the spray rate of the liquid drops is increased and the liquid drops are introduced into the compressor, due to the effect of intermediate cooling, the compression work is reduced, thus the gas turbine efficiency is improved. Fine liquid drops transferred into the compressor along with the air flow evaporate up to the saturated temperature at the stages as they pass through the rotor blades and the stator vanes, and then the evaporation latent heat reduces the operating fluid temperature.

In a multistage axial compressor, the main flow temperature falls as the liquid drops are vaporized from the upstream side of the compressor, so that the load distribution in the flow direction becomes different from that of the general operation, such that the blade loading reduces on the upstream side of the compressor, while the blade loading increases on the downstream side. Generally, in the partial load operation of a gas turbine, the blade loading on the downstream side of the compressor becomes larger than that on the upstream side, so that when liquid drops are sprayed at the time of partial loading, the blade loading on the downstream side is increased more, thus there is a risk of reducing the blade reliability. Therefore, the spraying of liquid drops is started at the time of stable operation when the gas turbine reaches the rated load.

Further, in the compressor, the clearance between the inner wall surface of the casing and the outer peripheral portion of the rotor blades varies with the thermal expansion difference between the rotor and rotor blades and the casing and if the thermal expansion of the casing is larger than that of the rotor, the tip clearance of the rotor blades is increased and the efficiency of the compressor is reduced extremely. Inversely, if the thermal expansion of the rotor or rotor blades is excessively larger than the thermal expansion of the casing, there is a possibility that the rotor blades and the inner wall surface of the casing will make contact with each other to cause damage to the tips of the rotor blades. In the compressor of a general simple cycle gas turbine, in consideration of the thermal expansion difference, the rotor blade tip clearance is designed so as to be optimum at the time of the rated operation. However, in a compressor in which a large quantity of liquid drops are sprayed for the intake air of the gas turbine to execute intermediate cooling, the liquid drops are sprayed at the time of rated operation, so that the thermal deformation of the casing is utterly different from that of the general simple cycle gas turbine.

Under control of the rotor blade tip clearance of the simple cycle gas turbine, the thermal expansion difference between the casing of the compressor and the rotor and rotor blades maximizes in the high-temperature region at the downstream stage of the compressor, so that as a control structure for the rotor blade tip clearance, there is, for example, one indicated in the patent literature 1. The patent literature 1 discloses a technology of cooling the inner casing of the compressor from the periphery thereof by bleed air bled from the intermediate stage of the compressor, thereby reducing the temperature incline of the compressor in the axial direction so as to control the clearance between the inner wall surface of the casing and the rotor blade tip.

CITATION LIST

Patent Literature

Patent Literature 1
Japanese Patent Laid-open No. 2004-3492

SUMMARY OF INVENTION

Technical Problem

The thermal deformation of the compressor casing at the time of the rated operation of the simple cycle gas turbine described in the above technology is largely different from the thermal deformation of the casing at the time of the rated operation of the compressor that executes intermediate cooling by spraying a large quantity of liquid drops. The following will explain the difference.

Firstly, in the simple cycle gas turbine, the temperature of the main flow flowing inside the compressor, due to an enthalpy increase by the compression operation, is heated up to about 400° C. to 450° C. on the rear stage side compared with that on the front stage side (nearly the atmospheric temperature). Therefore, the casing increases in the thermal expansion on the rear stage side compared with on the front stage side. Meanwhile, in the compressor in which a large quantity of liquid drops are sprayed into sucking air, in the flow direction of the compressor, the liquid drops are accumulated in the casing from the upstream side to the intermediate stage, so that the casing is cooled rapidly and the thermal expansion of the casing at the intermediate stage is suppressed. Therefore, there is a possibility that the thermal expansion of the rotor and the rotor blades will be increased compared with the thermal expansion of the casing. On the rear stage side of the compressor, the liquid drops are evaporated perfectly, so that the possibility that the casing will be cooled due to adhesion of liquid drops is low.

Therefore, in the technology described in the patent literature 1, the axial compressor including the intermediate cooling effect by spraying liquid drops into the intake air of the compressor is not considered, so that when the intake air is sprayed, at the intermediate stage of the compressor, the clearance between the rotor blade tip and the inner wall surface of the casing becomes smaller and there is a risk that the rotor blade tip will make contact with the inner wall surface of the casing to cause damage to the rotor blade tip.

An object of the present invention is to provide an axial compressor that suppresses a reduction in a clearance between the intermediate stage rotor blade tip and the inner wall surface of the casing at the time of the rated operation of the axial compressor spraying liquid drops into sucking air and has excellent reliability, and an operation method of the axial compressor.

Solution to Problem

To accomplish the above object, the present invention of an axial compressor comprising liquid drop feed means for feeding liquid drops to an operating fluid of the compressor, a casing for forming a flow path through which the operating fluid flows down and a plurality of stages, each of which is composed of one continuous rotor blade row and one continuous stator vane row, the axial compressor being structured so that the liquid drops evaporate inside the compressor, characterized in that: the casing is provided with a cavity therein, and the cavity is formed by an outer casing and an inner casing which is enclosing a periphery of the rotor blade rows at the plurality of stages and forming internally a flow path of the operating fluid, and a flow path is provided for feeding the operating fluid to the cavity on a downstream side of a region forming the cavity of the inner casing.

Advantageous Effects of Invention

According to the present invention, there can be provided an axial compressor that suppresses a reduction in a clearance between the intermediate stage rotor blade tip and the inner wall surface of the casing at the time of the rated operation of the axial compressor spraying liquid drops into intake air and has excellent reliability, and an operation method of the axial compressor.

DETAILED DESCRIPTION OF THE INVENTION

Figure 1:
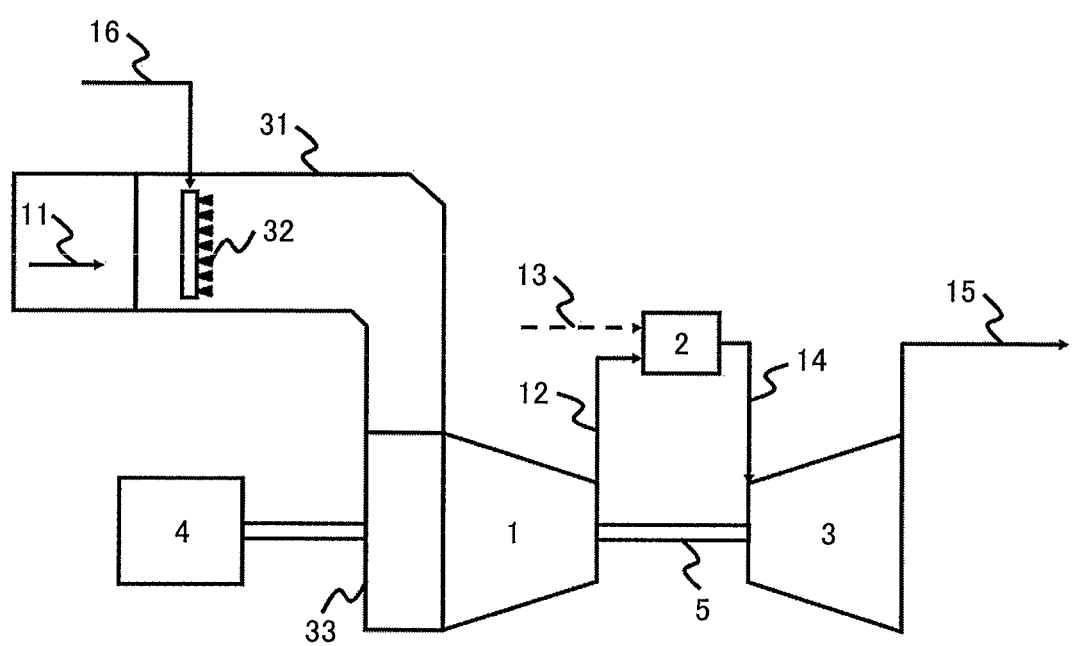
FIG. 1 is a block diagram of the gas turbine including the intake air spray which is one embodiment of the present invention.

FIG. 1 shows the outline of the entire schematic view of the gas turbine system including the intake air spray. Hereinafter, by referring to FIG. 1, a constitution of one embodiment of the gas turbine system including the intake air spray will be explained.

The gas turbine system is composed of a compressor 1 for compressing air and generating high-pressure air, a combustor 2 for mixing and burning compressed air and fuel, and a turbine 3 driven to rotate by high-temperature combustion gas. The compressor 1 and the turbine 3 are connected to a generator 4 via a rotary shaft 5.

Next, the flow of the operating fluid will be explained. Air 11 which is the operating fluid flows into the compressor 1 and by being compressed by the compressor 1, flows into the combustor 2 as high-pressure air 12. In the combustor 2, high-pressure air 12 and fuel 13 are mixed and burned to generate high-temperature combustion gas 14. The combustion gas 14 rotates the turbine 3 and then is discharged outside the system as exhaust gas 15. The generator 4 is driven by the rotation power of the turbine 3 transferred via the rotary shaft 5 interconnecting the compressor 1 and the turbine 3.

In a compressor of a fixed number of rotations at a fixed volume flow rate which is generally used in the gas turbine system, when the intake air temperature becomes high in the summer season, the air density is decreased and the mass flow rate of the sucking air is reduced, so that in correspondence to it, the fuel flow rate in the combustor is forced to reduce. Namely, there is a problem such that as the intake air temperature of the compressor rises, the output of the gas turbine reduces.

Therefore, there is a method of spraying liquid drops such as water to intake air of the compressor, thereby improving the gas turbine output due to the intake air cooling effect. As an intake air cooling method, there is a method of installing a medium type intake air cooler on the air intake duct and lowering the intake air temperature by permitting sucking air to pass through the intake air cooler. On the other hand, as shown in FIG. 1, a method of arranging liquid drops spray nozzles 32 in an air intake duct 31, spraying fine liquid drops into intake air, and vaporizing them in the air flow, thereby lowering the intake air temperature by the evaporation latent heat of the liquid drops is also available.

In the case of such a method of spraying liquid drops, if the liquid drop spraying rate is increased, in addition to the intake air cooling effect that liquid drops evaporate in the air intake duct, the liquid drops are fed into the compressor and vaporized in the compressor, thus the intermediate cooling effect can be expected. By doing this, the method can contribute to realization of high efficiency of the gas turbine due to output improvement of the gas turbine and compression work reduction. Further, in this embodiment, the liquid drops spray nozzles 32 are drawn only in one position of the air intake duct 31, though the spray nozzles may be installed by dividing into two stages of the air intake duct 31 and an air inlet plenum 33 at the inlet of the compressor.

Figure 2:
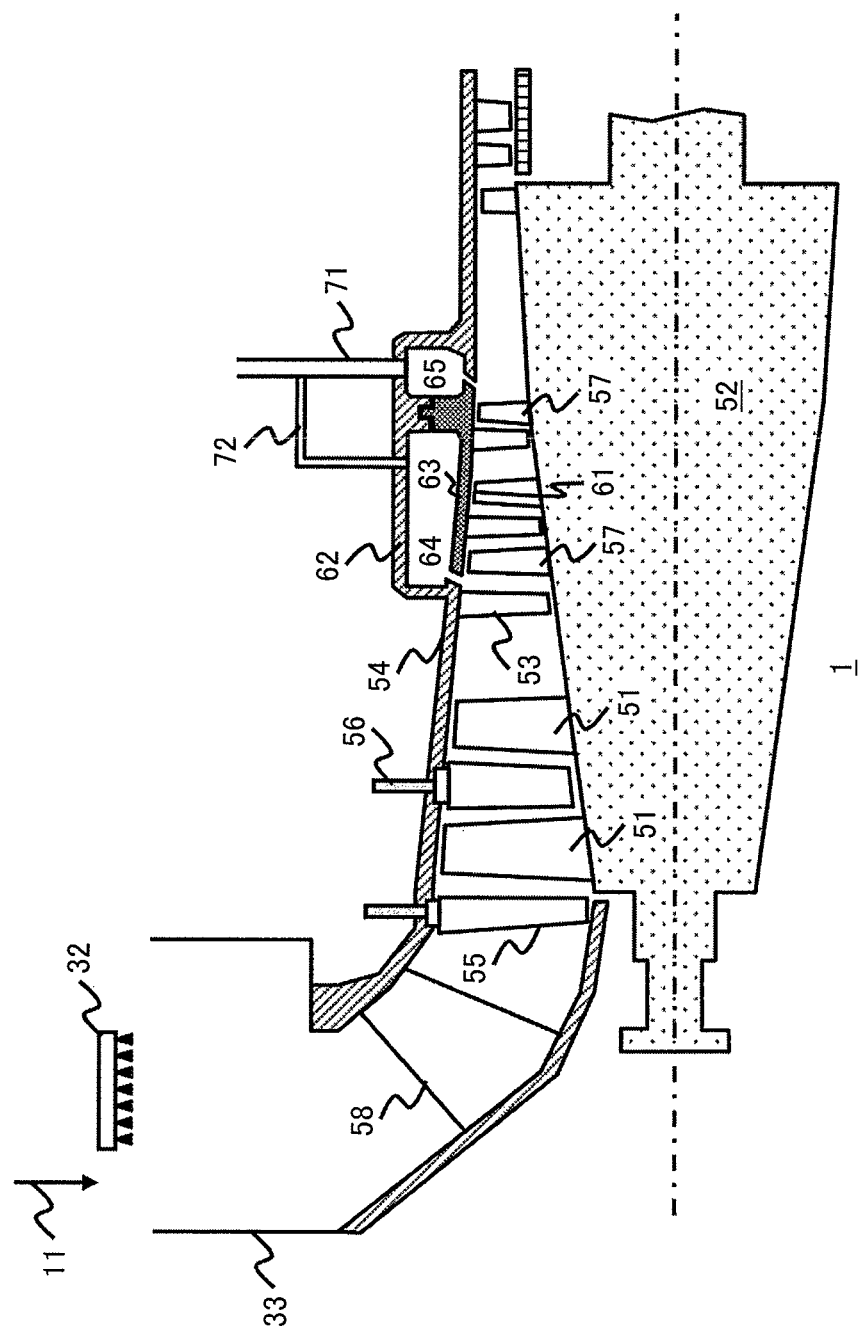
FIG. 2 is a cross sectional view of the meridian plane of the axial compressor which is a first embodiment of the present invention.

By referring to the block diagram of the meridian plane of the compressor shown in FIG. 2, the detailed structure of the compressor will be explained. The axial compressor 1 is composed of a rotating rotor 52 with a plurality of rotor blade rows 51 attached to and a casing 54 with a plurality of stator vane rows 53 attached to and by the outer peripheral surface of the rotor 52 and the inner peripheral surface of the casing 54, a circular flow path is formed. The rotor blade rows 51 and the stator vane rows 53 are arranged alternately in the axial direction and each stage is composed of one rotor blade row 51 and one stator vane row 53. On the upstream side of the rotor blade row at the first stage, an inlet guide vane (IGV) 55 for controlling the air sucking rate and adjusting the gas turbine loading is installed. Further, in the stator vane row at the front stage, to suppress rotating stall at the start time of the gas turbine, a variable mechanism 56 is included. In FIG. 2, the stator vane row 53 including the variable mechanism 56 is only the stator vanes at the first stage, though, there is a case that variable stator vanes are arranged on a plurality of stages.

The air 11 flowing in from the air intake duct (not shown) turns at 90° at the air inlet plenum 33 positioned on the upstream side of the compressor and is fed into the compressor. Liquid drops such as water are sprayed from the spray nozzles 32 arranged in the air intake duct, and fine liquid drops evaporate in the air flow, reduce the gas temperature flowing into the compressor by evaporation latent heat, and simultaneously increase the intake air density. Among the fine liquid drops transferred together with the air flow, the liquid drops which cannot be vaporized up to saturation in the air inlet plenum 33 flow into the compressor with the liquid drops kept.

Inside the compressor, the liquid drops, by passing through the rotor blade rows 51 and the stator vane rows 53, evaporate up to the saturation temperature and reduce the temperature of the operating fluid under compression. Due to the intermediate cooling effect, the compression characteristic approaches the isothermal compression, so that the power of the compressor is reduced. Ideally, it is desirable that all the liquid drops introduced into the compressor evaporate perfectly in the air flow up to discharge of the compressor. However, a part of the liquid drops injected from the spray nozzles 32 may not contribute to cooling of the main flow air, and may be accumulated as a liquid film and discharged as drain to the outside of the compressor.

Next, the liquid drop behavior not contributing to cooling of the main flow air of the compressor will be explained. As mentioned above, a part of the liquid drops sprayed by the air intake duct may collide with the wall surface of the air inlet plenum 33 and be accumulated as a liquid film. Further, after spraying, when the liquid drops interfere with each other and liquid drops with a large particle diameter are generated, the liquid drops are not transferred together with the air flow but collide with the wall surface and are accumulated as a liquid film. Furthermore, the liquid drops collide with a strut 58 and the IGV 55 which are positioned at the inlet of the compressor and a part thereof is adhered to the vane surface and forms a liquid film. A part of the liquid film is divided into secondary liquid drops with large particle diameters and the secondary liquid drops flow into the compressor. Inside the compressor, the liquid drops with large particle diameters collide with the rotor blades 51, are blown off toward the outer peripheral side by the centrifugal force due to rotation of the rotor blades and become a liquid film on the inner wall surface of the casing.

A part of the liquid film evaporates due to the thermal conduction of the casing, is divided again into secondary liquid drops, and flies to the downstream stage. The secondary liquid drops increase in the particle diameter, so that it becomes highly possible that they collide with the rotor blades and stator vanes on the downstream side and form a liquid film. The range of existence of such a liquid film is from the front stage of the axial compressor to the stage where the liquid drops evaporate perfectly in the compressor (hereinafter referred to as the evaporation completion stage) and it is confirmed that particularly within the range from the upstream side to the intermediate stage, a liquid film is generated. Further, the main flow temperature in the neighborhood of the evaporation completion stage is 300° C. or higher and even if the liquid drops collide with the inner wall surface of the casing, it is considered that the liquid drops evaporate instantaneously.

Next, the rotor blade tip clearance of the compressor will be explained. In the compressor, the clearance between the inner wall surface of the casing and the outer peripheral portion of the rotor blades varies with the thermal expansion difference between the rotor and rotor blades and the casing and if the thermal expansion of the casing is larger, the rotor blade tip clearance becomes large and the efficiency of the compressor reduces extremely. On the other hand, if the thermal expansion of the rotor or rotor blades is excessively large compared with the thermal expansion of the casing, the rotor blades and the inner wall surface of the casing make contact with each other, thus there is a possibility that the tips of the rotor blades will be damaged. This phenomenon becomes severest at the time of the rated operation of the gas turbine. The rotor and rotor blades on the front stage side are deformed mainly by the centrifugal force, while on the rear stage side, they are thermally deformed by the centrifugal force and thermal expansion, so that the estimate of the thermal expansion difference between the rotor and rotor blades and the casing is important in improvement of the compressor efficiency and security of the reliability.

In the compressor of the general simple cycle gas turbine, the temperature of the main flow flowing inside the compressor, due to an enthalpy increase by the compression operation, is heated up to about 400° C. to 450° C. on the rear stage side compared with that on the front stage side (nearly the atmospheric temperature). Therefore, the casing increases in thermal expansion on the rear stage side compared with that on the front stage side. In consideration of the thermal expansion difference, the rotor blade tip clearance is designed so as to be optimum at the time of the rated operation. However, actually, the thermal deformation manner of the casing becomes complicated as the main flow temperature rises, so that setting of the rotor blade tip clearance on the rear stage side with high precision is difficult. Therefore, in the compressor of the simple cycle gas turbine, a bleed chamber like a cavity is installed in the casing on the rear stage side and using bleed air therein, the casing on the downstream side is cooled, thus the rotor blade tip clearance is controlled.

On the other hand, in a compressor for performing intermediate cooling by spraying a large amount of liquid drops to intake air of the gas turbine, on the inner wall surface of the casing from the front stage side to the intermediate stage, a liquid film is formed. The main flow air temperature slowly rises from the atmospheric temperature in correspondence to the flow, so that the liquid film accumulated on the front stage side hardly influences the thermal deformation of the casing. However, at the intermediate stage positioned on the upstream side of the liquid drop evaporation completion stage, the liquid drops are adhered onto the high-temperature inner wall surface of the casing, so that the thermal deformation of the casing is influenced greatly.

The case that liquid drops are sprayed in a state that between the rotor blade tip at the intermediate stage at the time of the rated operation before spraying the liquid drops and the circular inner wall surface of the casing for enclosing the rotor blades, a fixed clearance is formed will be explained. When the liquid drops are accumulated on the casing at the intermediate stage and a liquid film is formed, the casing temperature falls due to the thermal conduction and the thermal expansion of the casing is suppressed. Therefore, the thermal expansion of the casing becomes smaller than the thermal expansion of the rotor and rotor blades and the clearance between the rotor blades and the inner wall surface of the casing is reduced. And, when the thermal expansion of the casing becomes small excessively, there is a possibility that the rotor blades will make contact with the inner wall surface of the casing, thus the tips of the rotor blades will be damaged.

On the other hand, in consideration of spraying of liquid drops, when the rotor blade tip clearance is designed so as to be large, the liquid drops are sprayed at the time of high air temperature, thus the thermal deformation of the casing is suppressed, and the rotor blade tip clearance can be minimized. However, at the time of low air temperature, the liquid drop spray is adjusted to a small flow rate or is stopped, so that due to enlargement of the rotor blade tip clearance, the efficiency of the compressor is reduced. Further, depending on the intake air temperature and the humidity condition of the compressor, the evaporative rate in the air intake duct varies, so that the evaporation position in the compressor varies. Namely, the evaporation completion stage varies with the atmospheric condition and the spray rate, so that at the time of design, it is difficult to precisely set the rotor blade tip clearance value. Further, when intake air is sprayed at the time of the partial loading operation when the operating temperature of the compressor is lower than that at the time of the rated operation, the thermal expansion of the rotor and rotor blades is suppressed, so that the rotor blade tip clearance can obtain room, though, the inlet guide vane (IGV) of the compressor is closed compared with that at the time of the rated operation, and the liquid drops collide with the IGV, and the drain amount is increased, and the intermediate cooling effect cannot be obtained effectively, and furthermore, the influence on the erosion of the rotor blades is worried.

Embodiment 1

By referring to FIG. 2, a compressor relating to the first embodiment of the present invention will be explained. In this embodiment, a cavity 64 interconnecting to the casing at the intermediate stage (on the upstream side of the liquid drop evaporation completion stage) of the axial compressor 1 in the peripheral direction is formed. Further, on the downstream side of the cavity 64, a cavity 65 interconnected similarly in the peripheral direction is formed. And, the cavity 64 is formed by a double casing composed of an outer circular casing 62 and an inner circular casing 63 enclosing the periphery of intermediate stage rotor blades 57 of the compressor and internally forming a compression flow path. And, a flow path 72 capable of feeding a part of high-temperature and high-pressure compressed air flowing down on the downstream side of the region where the cavity 64 of the inner peripheral side circular casing 63 is formed from the cavity 65 to the cavity 64 on the upstream side is equipped. In the flow path 72 capable of feeding the high-temperature and high-pressure air to the cavity 64 on the upstream side, a valve capable of controlling the flow rate may be installed.

Next, the influence on the rotor blade tip clearance when the liquid drop spraying of this embodiment is performed will be explained. As shown in FIG. 2, in the radial direction at the intermediate stage, when a cavity 64 is installed in the peripheral direction as two different double casing structures, the liquid drops are adhered to the inner circular casing 63, thus the thermal expansion is suppressed. However, in the outer circular casing 62 with the inner circular casing 63 attached to, compared with the case that the cavity 64 is not installed, the thermal capacity is reduced, and due to no-adhesion of liquid drops, the thermal expansion is suppressed little, and the inner circular casing 63 is supported by the outer circular casing 62, so that only by the thermal extension amount of the outer circular casing 62, the inner circular casing 63 moves in the radial direction. Therefore, the reduction in the clearance of a rotor blade tip 61 can be suppressed.

Furthermore, the high-temperature and high-pressure compressed air is fed to the cavity 64 on the upstream side from the cavity 65 at the downstream stage via the flow path 72, so that the temperature in the cavity 64 is controlled to a preset value by warming up the outer circular casing 62, thus the thermal expansion can be controlled; therefore, the reduction in the clearance of the rotor blade tip 61 can be suppressed. Further, the inner circular casing 63 is increased more in temperature, thus the liquid drops adhered onto the inner peripheral side of the inner circular casing 63 are vaporized and the occurrence of drain can be suppressed. Further, when a valve capable of controlling the flow rate of the compressed air fed to the cavity 64 on the upstream side is installed in the flow path 72, the temperature in the cavity 64 can be controlled more effectively and the clearance control and the suppression effect of drain occurrence can be made more remarkable.

Further, as for the material of the outer circular casing 62 and the inner circular casing 63, the inner circular casing 63, compared with the outer casing, may use validly a casing using a material low in the coefficient of linear expansion. The coefficient of linear expansion is calculated from the thickness and length of the casing and the product of the temperature difference and the coefficient of linear expansion of the casing material. For the inner circular casing 63, a material of a low coefficient of linear expansion is selected and high-temperature and high-pressure compressed air is fed into the cavity 64, thus the outer circular casing 62 thermally expands more, so that the interference of the rotor blade tip 61 with the inner wall surface of the inner circular casing 63 can be suppressed.

Furthermore, it is also effective to apply abradable coating to the inner wall surface of the inner circular casing 63 on the gas path side. The abradable coating, by spray-coating on the inner wall surface of the casing, since the coating portion is shaved easily even if the rotor blades interfere with the inner wall surface of the casing due to the rotation of the rotor blades, suppresses the damage of the rotor blades. On the inner side and the outer side, the casings are made different from each other, thus the abradable coating onto the inner casing can be executed easily and it is effective in the cost reduction.

In this embodiment, the high-temperature and high-pressure air bled from the cavity 65 on the downstream side via a bleed pipe 71 is used for blade cooling of the turbine and a part thereof is fed to the cavity 64 on the upstream side. Therefore, by a simple constitution, high-temperature and high-pressure air can be introduced into the cavity 64. Furthermore, the air of the cavity 64 on the upstream side is used as seal air for the bearing of the gas turbine, so that the compressed air is not discharged outside and the amount of heat can be effectively utilized in the gas turbine.

By use of the aforementioned constitution, in this embodiment, even if liquid drops are sprayed at the time of the rated operation, the interference of the rotor blade tip 61 with the inner wall surface of the casing can be avoided and the reliability of the axial compressor can be ensured. Further, the rotor blade tip clearance can be adjusted to an appropriate clearance due to existence of the liquid drop spray, so that efficiency improvement of the compressor and efficiency improvement of the gas turbine are enabled.

Embodiment 2

Figure 3:
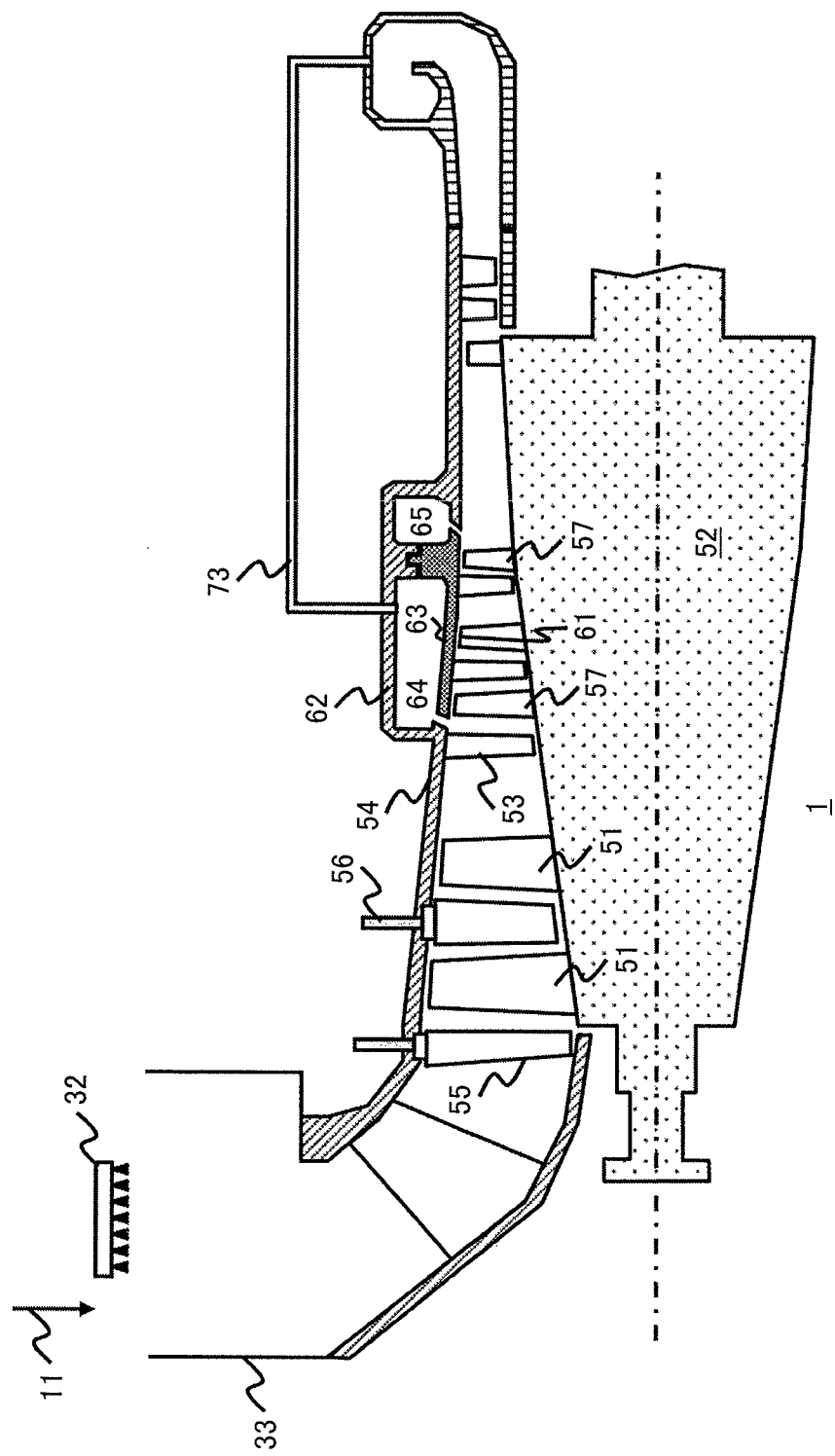
FIG. 3 is a cross sectional view of the meridian plane of the axial compressor which is a second embodiment of the present invention.

Next, by referring to FIG. 3, a compressor relating to the second embodiment of the present invention will be explained. FIG. 3 is a block diagram of the section of the meridian plane of the compressor and the different respect from the first embodiment shown in FIG. 2 is that the high-temperature and high-pressure air fed to the cavity 64 enclosing the periphery of the intermediate stage rotor blades 57 uses discharged air of the axial compressor 1 and a route 73 for feeding the discharged air is installed. The discharged air is used as shown in FIG. 3, thus the difference between the metal temperature of the outer circular casing 62 and the temperature of the air fed becomes larger than that when the air of the cavity 65 at the downstream stage shown in FIG. 2 is fed, so that by a small flow rate of feed air, the rotor blade tip clearance amount can be adjusted.

Here, as a structure effective in bleeding of the discharged air of the compressor, a high-moisture use gas turbine system will be explained as an example. The high-moisture use gas turbine is composed of a compressor, a combustor, a turbine, a humidification device, and a regeneration heat exchanger. In the intake air of the compressor, water is sprayed into the atmosphere by the intake air spray nozzles and moisture air is generated. The moisture air generated by the intake air spray is compressed by the compressor and the compressed air generated by the compressor is bled once at all the flow rates in the bleed hole formed in the outlet of the compressor. The high-pressure air bled from the outlet of the compressor is joined in one pipe and is humidified by the humidification device.

The moisture air humidified by the humidification device is fed to the regeneration heat exchanger for over-heating by exhaust gas from the turbine. And, in the regeneration heat exchanger, the moisture air fed from the humidification device is over-heated and is fed to the combustor. The moisture air fed to the combustor is mixed with fuel and is burned in the combustor. And, the generated combustion gas drives the turbine to rotate. The exhaust gas discharged from the turbine is heat-recovered by the regeneration heat exchanger and is discharged as exhaust gas.

In the regeneration heat exchanger, the thermal energy of the exhaust gas can be recovered by combustion air, so that the fuel flow rate in the combustor is reduced and the gas turbine cycle effect is improved. Further, moisture is added by the humidification device and the operating fluid is increased, thus the output of the high-moisture use gas turbine is increased. Furthermore, due to moisture addition, by the effect of the reduction in the operating fluid temperature and by the effect of the increase in the flow rate, the thermal recovery rate of the regeneration heat exchanger is increased and the efficiency of the high-moisture use gas turbine is improved.

In such a system, as mentioned above, there exists a structure for bleeding the discharged air of the compressor in all. Therefore, it is structurally easy to install a route for feeding a part of the high-temperature air from one pipe after bled once to the cavity. Namely, when incorporating the route 73 in the existing system, there is no need to largely change the existing system structure and a system for taking over the reliability of the existing system can be structured.

Here, the bleed flow rate of the compressor will be explained. When the air sucking rate of the compressor is set to 100%, the bearing seal air from the compressor is about 1% to 2% and the blade cooling air fed from the turbine stator vane side is about 3% to 5%. And, when the intake air spray rate is about 2 wt % (weight percent) of the air sucking rate, the metal temperature of the outer circular casing 62 for forming the cavity 64 shown in FIG. 3 is about 120° C. Further, the discharged air temperature of the compressor is about 400° C., so that air at about 400° C. is fed to the cavity 64. The discharged air fed to the cavity 64 is about 1% and the thermal expansion value of the casing is about 0.3 mm to 0.5 mm. The air amount fed from the discharged air to the cavity 64 is minute for the main flow, and the air fed to the cavity 64 contributes to warming-up of the casing and evaporation of liquid drops adhered to the wall surface and thereafter can be used as bearing seal air, so that the influence on the efficiency reduction of the gas turbine is considered to be minute.

Embodiment 3

Figure 4:
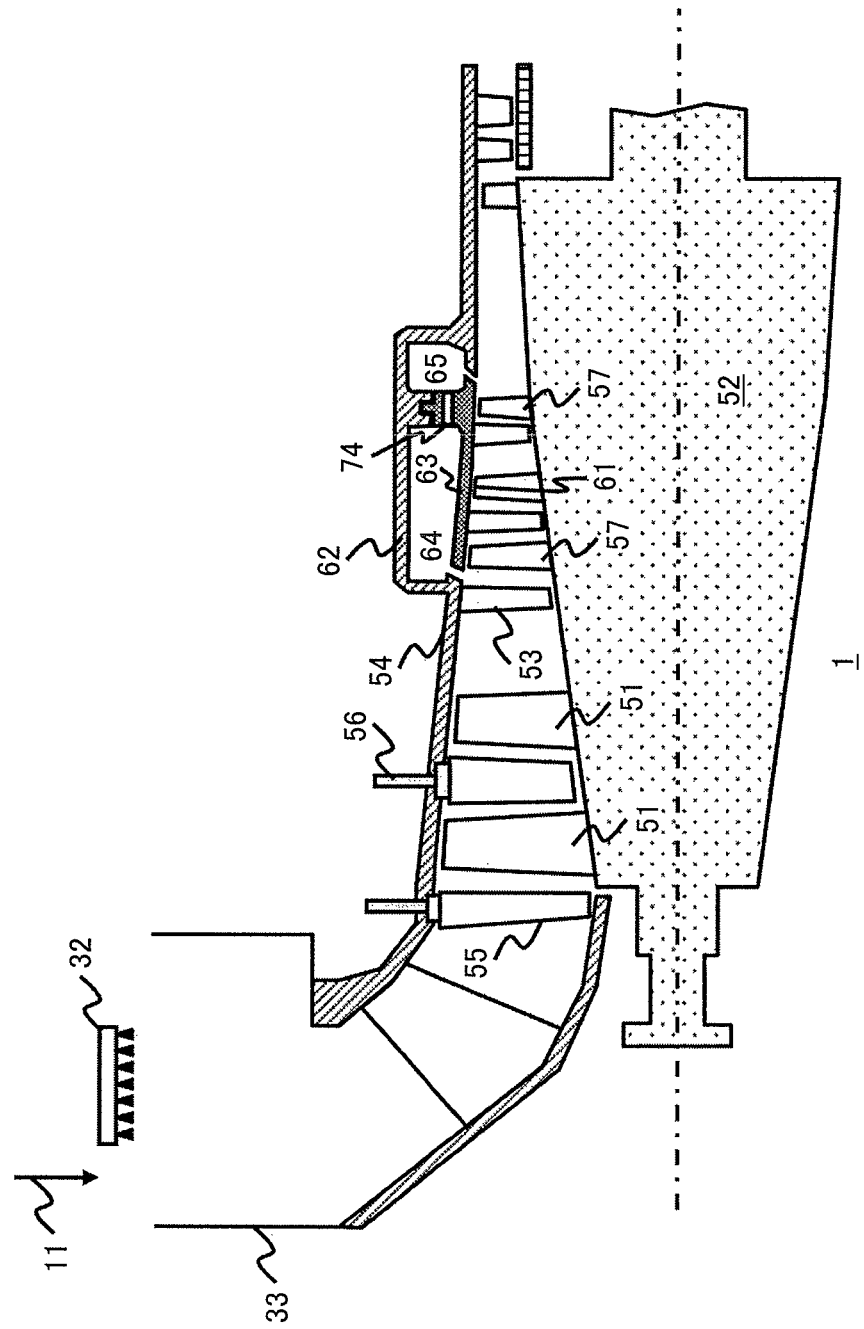
FIG. 4 is a cross sectional view of the meridian plane of the axial compressor which is a third embodiment of the present invention.

Next, by referring to FIG. 4, a compressor relating to the third embodiment of the present invention will be explained. FIG. 4 is a block diagram of the section of the meridian plane of the compressor and the different respect from FIG. 2 is that it is structured so that the high-temperature and high-pressure air fed to the cavity 64 enclosing the periphery of the intermediate stage rotor blades 57 is to be fed directly from the cavity 65 at the downstream stage via a route 74 interconnecting to the cavity 64 installed in the inner circular casing 63. The route 74 (interconnecting hole) has a structure that a plurality of holes are formed in the inner circular casing 63 in the peripheral direction.

The effect of warming-up of the outer circular casing 62 in this embodiment is similar to FIG. 2, though in this embodiment, the air feed route 74 is installed in the inner circular casing 63, thus there is an advantage that the piping can be simplified. However, high-temperature and high-pressure air is directly fed from the cavity 65 on the downstream side to the cavity 64 on the upstream side due to the pressure difference even in an operation state with no air intake spray existed, so that it is difficult to adjust the rotor blade tip clearance based on the presence or absence of the intake air spray.

Further, in this embodiment, the case where a constitution of forming an interconnection hole in the casing member for separating the cavity 64 and the cavity 65 is used and an interconnection hole is formed in the inner circular casing 63 as the route 74 is supposed, though, it is possible to install an interconnection hole in the outer circular casing 62 as the route 74.

Embodiment 4

Figure 5:
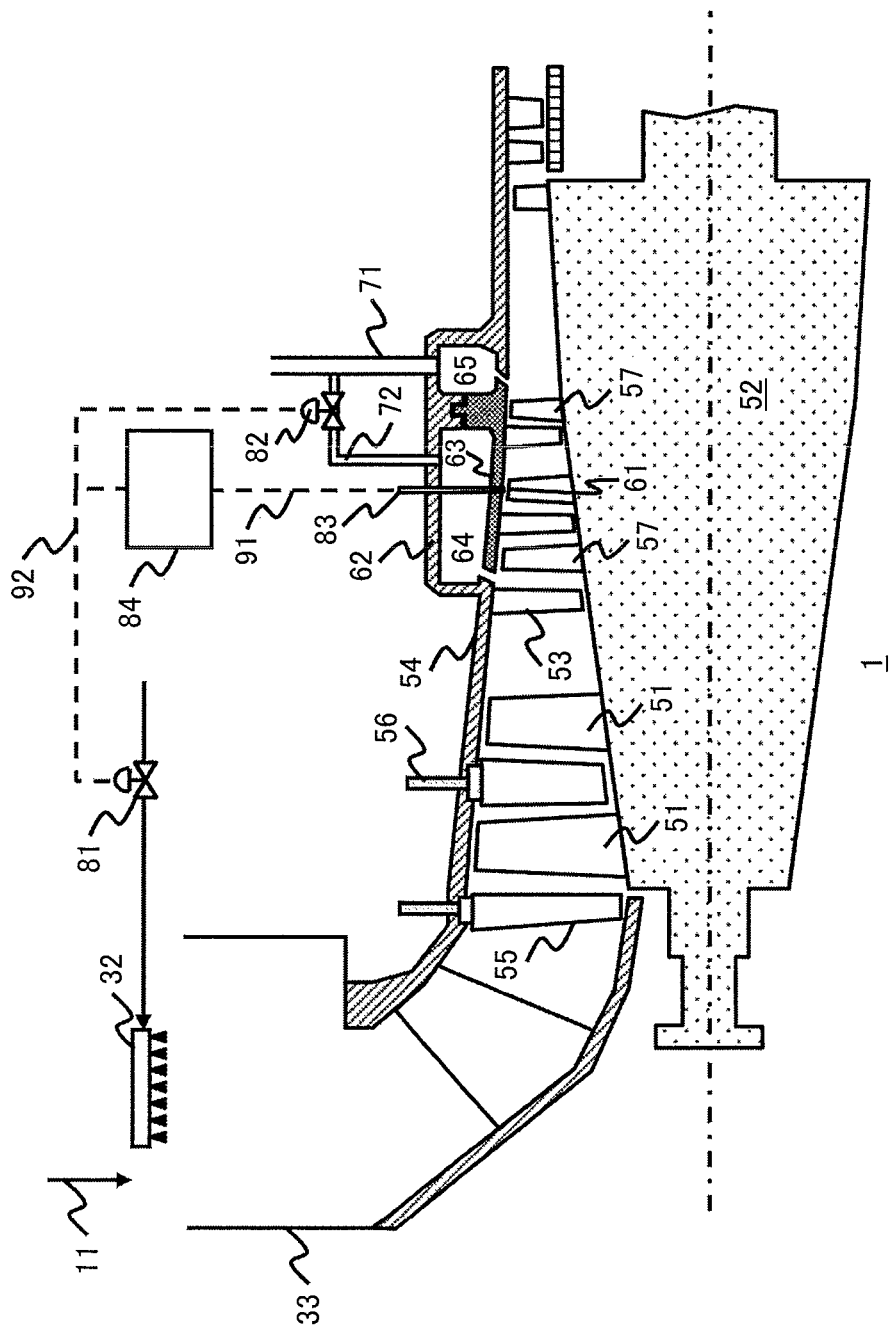
FIG. 5 is a block diagram of the control system which is a fourth embodiment of the present invention.

Next, by referring to FIG. 5, a compressor relating to the fourth embodiment of the present invention will be explained. FIG. 5 is a schematic view of the control system of this embodiment and the different respect from the first embodiment shown in FIG. 2 is a constitution that a valve 81 installed in the route for feeding liquid drops to the liquid drop spray nozzles 32, a valve 82 installed in the route for feeding high-temperature and high-pressure air to the cavity 64 at the intermediate stage, and a rotor blade tip clearance sensor 83 capable of measuring the rotor blade tip clearance at the intermediate stage positioned on the upstream side of the liquid drop evaporation completion stage of the compressor are installed, and a control unit 84 for receiving a measured value of the rotor blade tip clearance sensor 83 and controlling the valve 81 and the valve 82 in accordance with the measured value of the sensor is installed.

When the rotor blade tip clearance is measured and the clearance value is reduced, the liquid drop spray rate is decreased, thus the liquid drop amount adhered to the inner circular casing 63 can be reduced, and the interference of the rotor blade tips 61 with the inner wall surface of the casing can be suppressed. Further, when the rotor blade tip clearance is reduced, high-temperature and high-pressure air is fed to the cavity 64, thus the outer circular casing 62 is warmed up and the rotor blade tip clearance can be rationalized. By doing this, the reliability of the compressor at the time of liquid drop spray can be ensured.

Further, in this embodiment, a constitution of controlling two valves 81, 82 is used, though, by controlling only one of the pair 81, 82, the effect of the present invention can be produced. However, compared with controlling of the rotor blade tip clearance by the operation of the valve 81 of liquid drop spray, by operating the valve 82 for feeding high-temperature air to the cavity 64, the rotor blade tip clearance can be controlled in a shorter period of time.

Further, in this embodiment, the case that in the route 72 explained in the first embodiment, the means for adjusting the flow rate is installed is explained, though, even in the case that in the route 73 explained in the second embodiment or the route 74 explained in the third embodiment, the means for adjusting the flow rate is installed, the similar control can be executed.

Embodiment 5

Figure 6:
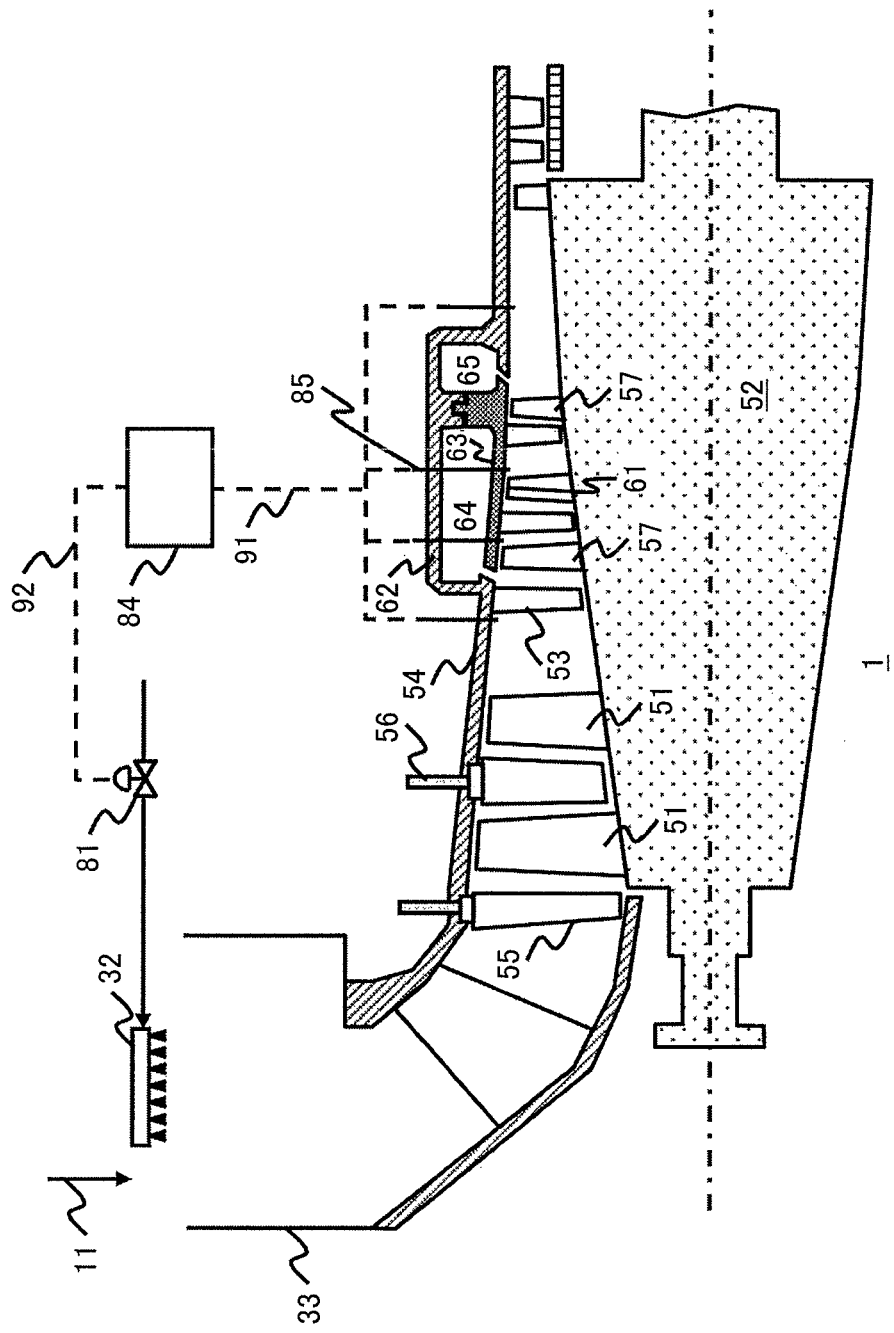
FIG. 6 is a block diagram of the control system which is a fifth embodiment of the present invention.

Finally, by referring to FIG. 6, a compressor relating to the fifth embodiment of the present invention will be explained. The different respect from the operation control method of the fourth embodiment explained by referring to FIG. 5 is a constitution that in place of the sensor for measuring the rotor blade tip clearance, as a temperature measuring means, a temperature measuring sensor 85 is installed in the inner circular casing 63, and from measuring of the temperature in the compressor and the metal temperature of the inner circular casing 63, the rotor blade tip clearance is predicted. In this embodiment, a prediction formula for inferring the rotor blade tip clearance from the main flow temperature and the casing metal temperature measured by the temperature measuring sensor 85 is prepared beforehand, and the rotor blade tip clearance is inferred from the temperature measurement results, and the valve 81 of liquid drop spray is operated, thus the spray rate is controlled.

In this embodiment, the temperature measuring sensor 85 represented by a thermocouple is lower in price than the rotor blade tip clearance sensor. Therefore, a plurality of sensors can be installed in the axial direction of the compressor at a similar cost and the temperature can be measured at a plurality of points, so that there is an advantage that the measuring accuracy is improved. However, when measuring the temperature of the main flow, liquid drops with a large particle diameter flowing inside the compressor adhere on the casing and at the same time, it is highly possible that liquid drops are adhered even to the temperature measuring sensor 85. If liquid drops are adhered to the sensor, the temperature measurement error is increased. Particularly, it is considered that the liquid drops adhered to the casing are accumulated on the lower half side of the casing due to the gravity, so that it is desirable to install the temperature measurement sensor on the upper half side of the casing. Further, it is necessary to feed purge air for suppressing liquid drop adherence.

Further, although not shown, in place of the control by the valve 81 of liquid drop spray, even when the flow rate of the high-temperature and high-pressure air to be fed to the cavity 64 is controlled by the valves installed in the routes 72 to 74 for feeding the high-temperature and high-pressure air to the cavity 64, the object of this embodiment can be accomplished. Further, as mentioned above, when controlling the flow rate of the high-temperature and high-pressure air to be fed to the cavity 64, the rotor blade tip clearance can be controlled in a shorter period of time.

The invention claimed is:

1. An axial compressor comprising a liquid drop spray nozzle for feeding liquid drops to an operating fluid of the compressor as intake air, a casing for forming a flow path through which the operating fluid flows down and a plurality of stages, each of which is composed of one continuous rotor blade row and one continuous stator vane row, the axial compressor being structured so that the liquid drops evaporate inside the compressor, characterized in that:

the casing is provided with a cavity therein, and the cavity is formed by an outer casing and an inner casing which is enclosing a periphery of the rotor blade rows at the plurality of stages and forming internally a flow path of the operating fluid, and another flow path is provided for feeding the operating fluid to the cavity on a downstream side of a region forming the cavity of the inner casing, wherein the another flow path is a flow path for feeding the operating fluid bled from an intermediate stage of the compressor via a bleed pipe as turbine cooling air for cooling a turbine driven by high-temperature combustion gas and connected to the cavity for feeding a part of the operating fluid to the cavity.

2. The axial compressor according to claim 1, wherein:

the inner casing is formed by a material with a low coefficient of linear expansion compared with a material of the outer casing.

3. The axial compressor according to claim 1, comprising:

means for adjusting a flow rate of operating fluid fed to the cavity.

4. The axial compressor according to claim 3, comprising:

means for adjusting a flow rate of liquid drops fed to the operating fluid by the liquid drop spray nozzle.

5. The axial compressor according to claim 4, comprising:

measuring means capable of measuring a clearance between an inner peripheral surface of the inner casing and tips of rotor blades at the plurality of stages enclosed and arranged by the inner peripheral surface, and a control unit, in accordance with a measured value of the clearance measured by the measuring means, for controlling at least one of the means for adjusting a flow rate of the operating fluid fed to the cavity and the means for adjusting a flow rate of the liquid drops fed to the operating fluid.

6. The axial compressor according to claim 3, comprising:

temperature measuring means for measuring a temperature in the inner casing, and a control unit, in accordance with a temperature measured by the temperature measuring means, for inferring a clearance between an inner peripheral surface of the inner casing and tips of rotor blades at a plurality of stages enclosed and arranged by the inner peripheral surface and controlling at least either the means for adjusting a flow rate of the operating fluid fed to the cavity or means for adjusting a flow rate of liquid drops fed to the operating fluid.

7. The axial compressor according to claim 1, wherein:

the flow path is a flow path for feeding a part of turbine cooling air for cooling a turbine driven by high-temperature combustion gas to the cavity.

8. The axial compressor according to claim 1, wherein:

abradable coating is applied to an inner peripheral side of the inner casing.

9. An operation method of an axial compressor comprising a liquid drop spray nozzle for feeding liquid drops to an operating fluid of the compressor as intake air, a casing forming a flow path through which the operating fluid flows down, and a plurality of stages, each of which is composed of one continuous rotor blade row and one continuous stator vane row, the axial compressor being structured so that the liquid drops evaporate inside the compressor, wherein the casing is provided with a cavity therein, and the cavity is formed by an outer casing and an inner casing which is enclosing a periphery of the rotor blade rows at a plurality of stages and forming internally a flow path of the operating fluid, and another flow path is provided for feeding the operating fluid to the cavity on a downstream side of a region for forming the cavity of the inner casing, and the another flow path is a flow path for feeding the operating fluid bled from an intermediate stage of the compressor via a bleed pipe as turbine cooling air for cooling a turbine driven by high-temperature combustion gas and connected to the cavity for feeding a part of the operating fluid to the cavity, the operation method comprising the steps of:

measuring or inferring a clearance between an inner peripheral surface of the inner casing and tips of the rotor blades at a plurality of stages enclosed and arranged by the inner peripheral surface, and adjusting at least either a flow rate of the operating fluid fed to the cavity or a flow rate of liquid drops fed to the operating fluid in accordance with the measured or inferred clearance.

10. An axial compressor comprising liquid drop feed means for feeding liquid drops to an operating fluid of the compressor, a casing for forming a flow path through which the operating fluid flows down and a plurality of stages, each of which is composed of one continuous rotor blade row and one continuous stator vane row, the axial compressor being structured so that the liquid drops evaporate inside the compressor, characterized in that:

the casing is provided with a cavity therein, and the cavity is formed by an outer casing and an inner casing which is enclosing a periphery of the rotor blade rows at the plurality of stages and forming internally a flow path of the operating fluid, and a flow path is provided for feeding the operating fluid to the cavity on a downstream side of a region forming the cavity of the inner casing, wherein the casing is provided with a downstream side cavity through which the operating fluid on a downstream side of the region for forming the cavity of the inner casing flows in on a downstream side of the cavity, and an interconnection hole for interconnecting the cavity and the downstream side cavity is provided in the outer casing or the inner casing as the flow path for feeding the operating fluid to the cavity.

* * * * *